Feb. 25, 1964 C. D. COFFEY 3,122,317
AUTOMATIC THERMOSTATIC CONTROL DEVICE
Filed Dec. 13, 1962 3 Sheets-Sheet 3

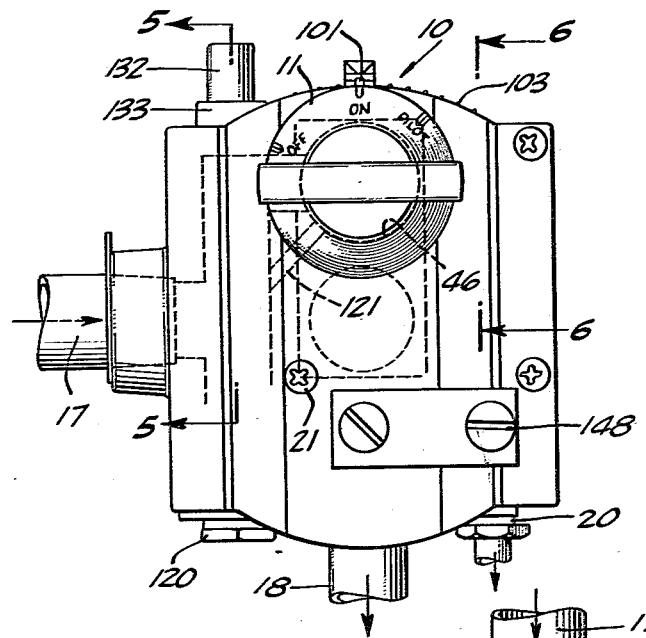
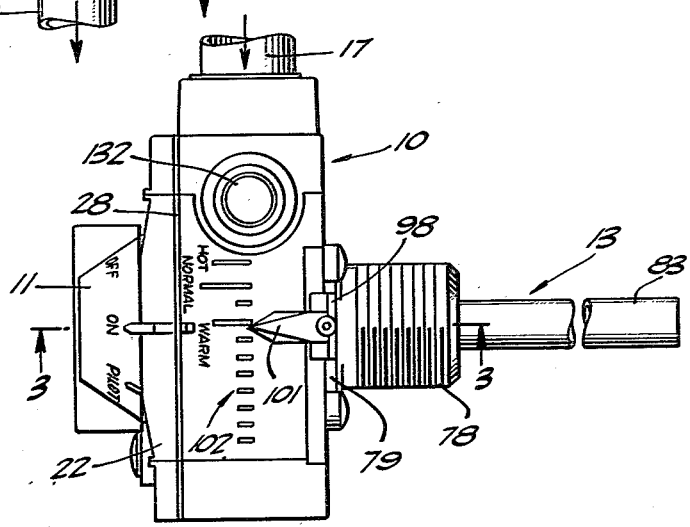
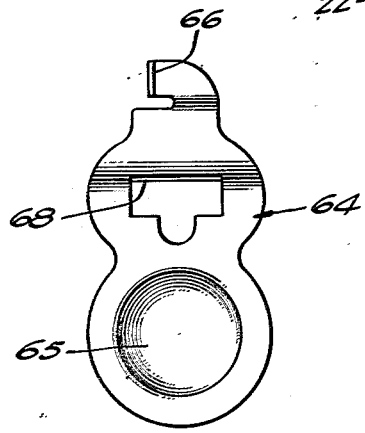

INVENTOR.
CHARLES D. COFFEY
BY
Albert M. Herzig
ATTORNEY

United States Patent Office 3,122,317
Patented Feb. 25, 1964

3,122,317
AUTOMATIC THERMOSTATIC CONTROL DEVICE
Charles D. Coffey, Inglewood, Calif., assignor to
Deutsch Controls Corp.
Filed Dec. 13, 1962, Ser. No. 244,471
4 Claims. (Cl. 236—21)

This invention relates to an automatic thermostatic control device for temperature control of water heaters for example and other gas-fired appliances. The invention is embodied in a universal automatic control unit of the type which is a unitary device, embodying therein a manually operated gas valve or gas cock, which can be turned to an "Off" position; an automatic temperature controlled valve, and an automatic safety valve responsive to the presence of a pilot flame. The device is a unitary one embodying in it all of the essential controls for the heater or device being controlled. The invention is directed more particularly to certain improvements in the assembly whereby the combination or assembly is made completely safe and positive. The improvements lie in an interlock between the manual operator for the gas cock, and the thermostatic valve for positively closing the latter when the manual operator is in the "Pilot" position. This prevents any gas from going to the main burner in this position. As will be made clear hereinafter, this result is achieved in a control of this type embodying a simplified plug valve having a single side port which controls both the main and pilot gas.

The object of the invention is the achievement and realization of the results and advantages as outlined in the foregoing.

Another object of the invention is to provide a universal thermostatic control device of the type referred to, in the form of a simplified and more dependable and positive assembly, particularly in respect of the particular arrangement for increased safety as set forth in the foregoing.

More specifically, it is an object of the invention to provide a thermostatic control device of the type described, wherein the supply of gas to the main burner is shut off manually, by means of an interlock acting on the thermostatic valve and actuatable by the manual operator for the plug cock, to prevent flow of gas to the main burner in the "Pilot" position, while allowing a flow to the pilot burner through the plug cock.

Further objects and numerous additional advantages of the invention will become apparent from the following detailed description and annexed drawings wherein:

FIG. 1 is a top plan view of a preferred form of the invention;

FIG. 2 is a side elevational view of the form of the invention shown in FIG. 1;

FIG. 8 is a detail view of the override lever.

The assembly is in a housing as designated at 10 in the figures and as pointed out in the foregoing, it is a universal type automatic control unit. The invention will be described herein as exemplified in a control device for a gas-fired water heater. The unit embodies in it a manually operable gas cock or plug cock which is operable by the manually rotatable handle or knob 11. There is also an automatic thermostatic valve which will be explained more in detail presently which is operable by a thermostat designated at 13. The assembly includes a safety valve which shuts off automatically in the event of failure of flame at the pilot burner. The safety valve is assembled in the same housing; the safety valve is designated generally by the numeral 15 in FIG. 5 which is a sectional view taken along the line 5—5 of FIG. 2.

Figure 3:
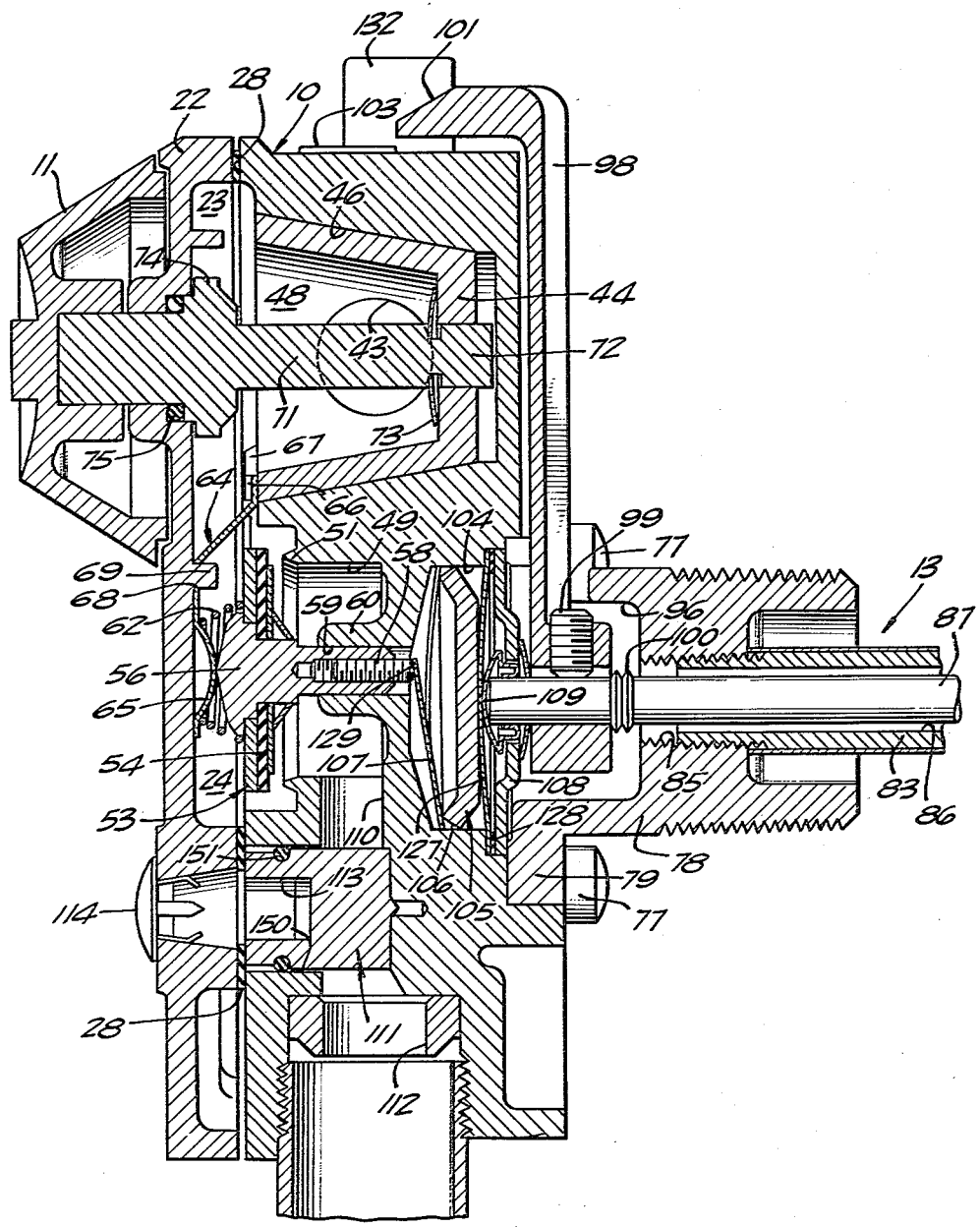
FIG. 3 is a cross sectional view taken along line 3—3 of FIG. 2.
Figure 6:
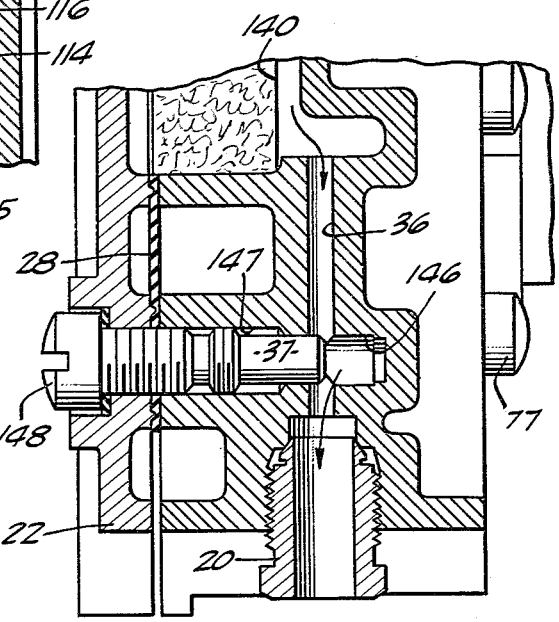
FIG. 6 is a cross sectional view taken along line 6—6 of FIG. 1.

The main gas inlet or supply is designated at 17 in FIG. 1. The outlet is designated at 18 as shown in FIG. 1 and FIG. 3. Outlet 18, of course, connects to the main gas burner. The supply line for gas being conducted to the pilot burner connects to a threaded nipple as designated at 20 in FIG. 1 and FIG. 6.

Before proceeding to a detailed description of the parts of the assembly, it should be understood that normally the flow of gas through the valve is controlled in response to the thermostat 13. The rotor valve or gas cock can be manually turned to an "Off" position at any time by the manual knob or button 11. If, at anytime, the pilot flame at the pilot burner should go out, the safety valve 15, FIG. 5, will close automatically to shut off the flow, this valve being electro-magnetically controlled as will be described. In the event the safety valve shuts off, it can be manually reset and interlock means are provided to prevent flow of gas to the main burner during the resetting, and as the pilot burner can only be lit when the knob 11 is in the "Pilot" position this is a significant safety feature or aspect of this control device. The purpose is to preclude the possibilities of slugs of gas being allowed to go to the main burner when the pilot is out or the safety valve is being reset. Such gases could accumulate in the combustion chamber and then when the pilot burner is lighted an explosion might occur. This purpose is accomplished by positively closing the thermostatic control valve. In the "Pilot" position gas enters through the port in the plug cock and goes to the pilot burner but not the main burner.

To now proceed to the details of the assembly, the housing 10 in the form of the invention shown is generally rectangular. It has a top cap or cover member 22 which may be attached by screws 21. This member has openings or cavities as designated at 23, 24 and 25, and the parts of the cap surrounding these openings bear against the body of the valve assembly with a sealing gasket 28 there between.

Figure 5:
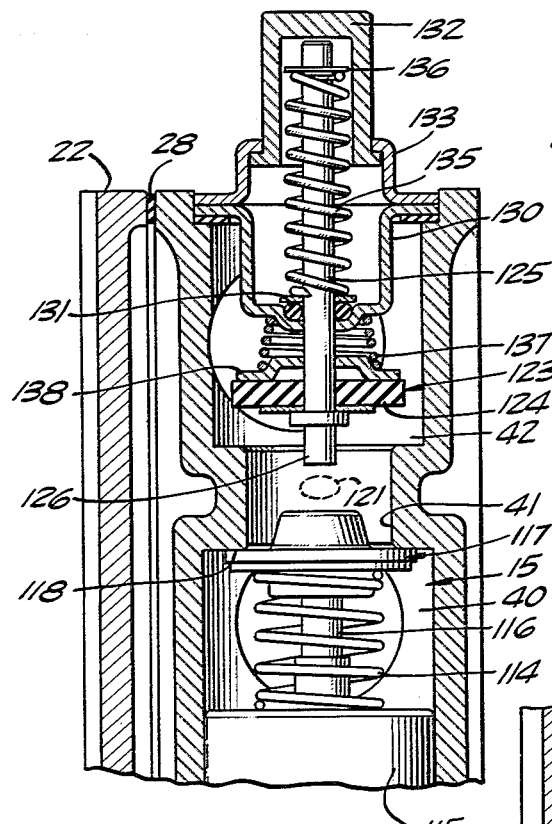
FIG. 5 is a cross sectional view taken along the line 5—5 of FIG. 1.
Figure 4:
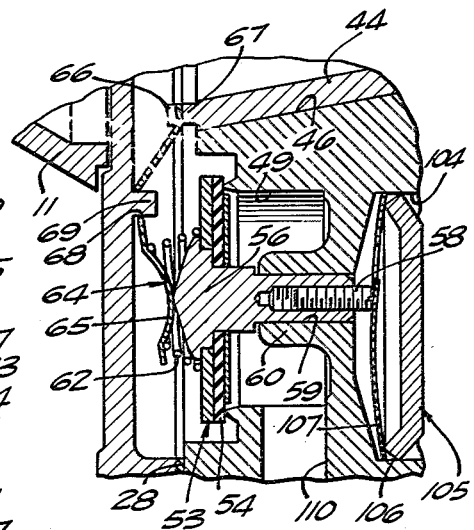
FIG. 4 is an enlarged detail view of the thermostatic valve shown in FIG. 3.

The inlet 17 shown in FIG. 2 communicates directly with the space as designated at 40 in the safety valve body or component as shown in FIG. 5. The safety valve port is designated at 41 communicating with space 42 which may have communication with the circular port 43 in the plug cock or rotor 44, as will be described.

Within the body of the valve there is a tapering bore 46 in which fits the tapering plug cock or rotor 44. The plug cock is internally configurated to have a hollow space as designated at 48 communicating with space 23 and space 24 over the thermostatic valve.

The bore 46 has a circular side port (not shown) which cooperates with the port 43. In the "On" position these ports register with each other and supply gas to the main and/or pilot burner. In the "Pilot" position there is enough overlapping of these ports so that there is an adequate supply of gas to the pilot burner. There is no separate port in the valve for the pilot gas. Thus in moving between positions of the plug cock there is no momentary closing of a port controlling pilot gas by its passing an obstructing surface between other ports. This achieves the result that there is no interruption of flow and no flickering of the pilot gas flame when valve member 124 is relieved of its responsibility of interrupting the flow of gas into space 42 and the knob 11 is turned from the "Pilot" position to the "On" position.

Knob 11 is on a stem 71 having a foot part 72 received in a similarly shaped opening in the bottom of rotor 44.

These parts are held together by a slotted resilient disc 73, the foot part having a narrowed portion received in the slot of the disc. The stem 71 has an enlarged part 74 having a square annular shoulder which seals against a sealing ring 75 in an annular space in cover 22.

Figure 7:
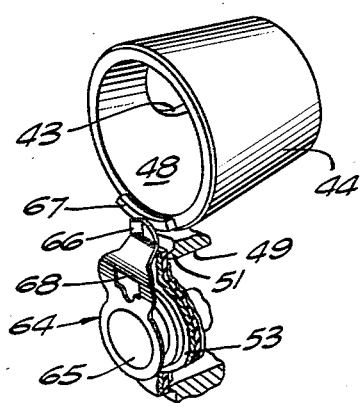
FIG. 7 is a detail perspective view of the override lever and plug or rotor.

Parallel to the bore 46 of the plug cock 44 is a bore 49 providing an annular valve seat 51, and cooperating with this seat is the thermostatic valve 53. The valve member 53 carries a resilient annular sealing member 54. The valve member 53 is disk shaped and has a central stem member 56, and received within a bore in this stem part is a screw or threaded member 58 which is actuatable by the thermostatic device as will be described presently. Stem 58 slides in a bore 59 in boss 60 in the valve body. The valve member 53 is normally urged against the seat 51 by a coil spring 62, the other end of which bears against a button 65 on an override lever, or actuator 64 which is manually actuatable by the knob 11 to close the thermostatic valve as will be described. The actuator 64 is shaped as shown in FIG. 8, and has an extending lug 66 actuatable by cam surface 67 on rotor 44 as shown in FIG. 7. Lever 64 has an opening 68 by which it is tiltably mounted on lug 69. The plug cock 44 is shown in perspective in FIG. 7 along with the cam surface 67 at the top edge as shown.

Thus, when the knob 11 is turned, it rotates the plug 44; cam surface 67 engages lug 66 to operate override lever 64 and to positively close the thermostatic valve in the "Pilot" position of knob 11.

The valve body 10 has attached to it a threaded boss or fitting 78 having a flange 79 to which is attached, such as by screws 77. The member 78 has a threaded bore 85. The thermostat 13 is of a type comprising a tubular member 83 having a threaded end threaded into threaded bore 85 in the member 78. The member 83 has a bore 86 and within this bore is a stem 87 of a different material than the tubular member 83, these materials having different coefficients of expansion relative to temperature. With the member 78 is a cavity 96 and mounted on the stem 87 is an adjusting member or member 98 held on by set screw 99. The adjusting handle 98 extends outwardly through a slot opening in the side of the member 78 as may be seen in FIG. 3. It has a pointer or finger 101 which moves opposite a graduated scale 102 on an arcuate formation 103 provided on a side part of the valve body. The adjusting member 98 adjusts the threaded relationship between stem 87 and member 86 and thereby varies the axial positioning force provided by the elements of the thermostat to vary the temperature that will be held by the thermostat as will become apparent presently. This is done by member 98 bearing against threads 100 on stem 87.

Stem 58 extends into a bore 104 in body 10. It is not axially aligned with stem 87. In the bore 104 is a plunger member 105 having a peripheral extending lip 106 which bears against the peripheral edges of a snap disk 107. Stem 87 extends through ring or plug 108 and bears on thrust button 109. Button 109 bears against sealing diaphragm 127 sealed by gasket 128, diaphragm 127 bearing against plunger 105. The snap disc 107 is of a configuration having an intermediate slot and extending tongue 129 which is engaged by stem 58. The disc operation is with a snap action having a predetermined differential as known in the art. The result is that the thermostat 13, depending upon its adjustment will maintain a predetermined temperature of water in the heater by controlling the gas flow through the valve to maintain this temperature.

The main gas after passing valve 53 passes through channel 110, past an adjustable butterfly valve 111 which can be manually set to control the flow of main gas. It then passes through bushing 112 to gas outlet conduit 18. Valve 111 has an opening 113 to receive an adjusting tool which can be inserted by removing spring closure button 114. Valve 111 is received in a bore 150 in body 10 and is sealed by O-ring 151.

To briefly review the flow of the main gas through the valve, it comes in at the inlet 17, FIG. 1, and enters the space 40 as designated in FIG. 5. It passes through the safety valve port 41 into the space 42 which communicates with the gas cock, FIG. 3. It then goes to the thermostatic valve and then through channels 110 and the butterfly valve 111, to the outlet 18. The flow of gas to the pilot burner will be traced in detail presently.

Reference will be had now, particularly to the safety valve component of the assembly shown more in detail in FIG. 5. The safety valve embodies an electro-magnet designated generally at 115 having an armature cooperating with a stem 116 attached to the safety valve 117. The safety valve cooperates with a seat 118 at one end of the port 41. The electro-magnetic assembly includes a threaded fitting which threads into a threaded bore in a side part of the valve body and this assembly has a fitting as shown at 120 in FIG. 1 which is adapted to receive the thermo-couple leads which lead from the electro-magnet 115 to a thermo-couple disposed in the flame of the pilot burner.

Cooperating with the opposite end of the port 41 is another valve member 123 which is an interrupter valve having a resilient seating and sealing member 124. This valve member is slideable upon a stem 125, which is a reset stem, having an end part 126 which may pass through the port 41 and engage the valve member 117 for resetting the said valve member. The stem extends through a bushing or cup 130 within the body of the valve, and is sealed therein by a sealing ring 131 in an annular groove adjacent to the stem. On the end of the stem 125 is a manual reset button 132 which slides in a sleeve or fitting 133 secured in a counter bore in a side part of the valve body. Numeral 135 designates a coil spring encircling the stem 125, one end of which bears against a washer and sealing ring 131, and the other end of which bears against a spring retainer disk 136 so that this spring normally urges the stem 125 in a direction to move the valve 123 away from its seat at the end of port 41. Coil spring 137 is interposed between a retainer 138 on this valve 123 and the bushing 130.

With reference to the operation of the safety valve component, when there is flame at the pilot burner, the electro-magnet 115 is energized by the thermo-couple and it is operable to hold the valve 117 off its seat against the force of its biasing spring 114. In the event of pilot failure, the electro-magnet is de-energized and the spring 114 seats the safety valve 117 on its seat 118. This valve cannot be reopened except manually. The electro-magnet 115 is strong enough to hold the valve 117 in open position after it has been manually opened when a sufficient current is generated by the pilot burner flame applied to the thermo-couple and introduced to the electro-magnet by thermo-couple lead wires, but it is not strong enough to initially open the safety valve. If the safety valve has operated to closed position, it may be manually opened, that is, reset by the button 132. When this button is pushed in, the knob 126 on the end of stem 125 engages valve 117 and resets it, that is, opens it, moving it to the position it is held in when the electro-magnet 115 is energized. If the pilot flame is burning, the safety valve will be held open when the button 132 is released. Whenever the stem 125 is actuated as described, the valve 123 will seat against the end of port 41 under the influence of spring 137. Thus, flow through the port 41 is cut off during resetting to insure that no gas at all is allowed to go to the main burner through this port until it is, in fact, established that there is flame at the pilot burner. When the button 132 is released, the spring 135 returns the reset mechanism to the position shown in FIG. 5.

During resetting, interrupter valve 123 cuts off flow through the port 41 so that, as described, there is no flow of gas through this port to the main burner. However, the port 121 which extends from the port 41 between the two valve members, allows flow of gas to the pilot burner during resetting or when the knob 11 is in the "Pilot" position only. This port allows pilot gas to flow through the rotor valve and to cavity 140, FIG. 6, which communicates with cavity 24 over the thermostatic valve. Cavity 140 communicates with valve 37 by way of the port 36 shown in FIG. 6. This needle valve is in a side part of the valve body as indicated in FIG. 1. The valve 37 is in a bore 146 including a counter bore 147. It is threaded near one end and is adjustable by adjusting screw 148 for adjusting the rate of bleed of gas to the pilot burner. The gas connection to the pilot burner is made to the threaded nipple 20 at the end of bore 36. It will be observed that the pilot gas can by-pass the safety valve 117 and interrupter valve 123. In the "Pilot" position it goes through the plug valve 44. It goes to the pilot burner through valve 37 but cannot go to the main burner through the thermostatic valve.

From the foregoing detailed description of the assembly and the description of the individual components, those skilled in the art will understand the nature of the invention and the over-all operation of it. The over-all operation will, however, be briefly summarized. In the "Off" position of the manual knob 11, the flow of gas both to the main burner and the pilot burner is cut off by the gas cock. The "On" position is the normal operating position during which time the thermostatic valve operates to control the flow to maintain a predetermined set temperature of the water as set by the adjustable member 98. In the "Pilot" position of the knob 11, the flow is cut off to the main burner because the thermostatic valve is positively closed as described. Closure of the thermostatic valve is by way of the override lever actuated by the rotor or plug cock.

In the normal operation, the valve 53 is actuated by the thermostat 13 to maintain the temperature of the water. In the event of pilot flame failure, the safety valve shown in FIG. 5 closes with valve 117 seating on seat 118. To reset the safety valve, the knob 11 is turned to the "Pilot" position and the button 132 is pushed to the full extent of the permissible travel which opens the safety valve 117 so that gas can pass into safety valve port 41 through port 121 through port 43 and through to the pilot burner. Button 132 is held down until the pilot burner is ignited and sufficient heat from the flame of the pilot burner generates enough current to energize the electromagnet and holds the safety valve 117 in the open position. Button 132 is then released and assumes its normal position as shown in FIG. 5.

From the foregoing, those skilled in the art will observe that the invention achieves the results and advantages outlined in the foregoing. The interlock between the manual knob 11 and the thermostatic valve introduces a safety factor not previously present. This is realized in a structure using a simplified gas cock or rotor having a single port in it, which controls both main and pilot gas.

The foregoing disclosure is representative of a preferred form of the invention and is to be interpreted in an illustrative rather than a limiting sense, the invention to be accorded full scope of the claims appended hereto.

I claim:

1. In a gas control of the type having a manually operated rotor valve, a thermostatic valve operable to variably control the flow of gas, and a safety valve automatically operable to cut off the flow of gas in the event of flame failure, the said rotor valve having on and off positions and a pilot position wherein a flow of pilot gas is allowed to pass the rotor valve, the improvement comprising interlocking means interposed between the manually operated rotor valve and the thermostatic valve whereby when the rotor valve is moved to the pilot position the thermostatic valve is positively closed whereby to prevent the passage of any gas to the main burner, passageways being provided for flow of pilot gas to the pilot burner.

2. In a gas control of the type having a rotor valve, an automatic thermostatic valve and a safety valve automatically operable to interrupt flow of gas in response to pilot flame failure, said rotor valve having positions wherein gas is permitted to flow to a main burner and wherein gas is permitted to flow only to a pilot burner, the improvements comprising interlocking means interposed between the said rotor valve and the thermostatic valve whereby when the rotor valve is in its pilot position said interlocking means positively closes the thermostatic valve whereby to prevent flow of any gas to the main burner, passageways being provided to allow flow to a pilot burner when the said rotor is in its pilot position.

3. In a gas control of the type having a plug type rotor valve, a thermostatic valve and a safety valve responsive to failure of a pilot flame to automatically cut off a flow of gas, said rotor valve having a position allowing a flow of gas to a main burner and another position allowing a flow of gas only to a pilot burner, the improvements comprising interlocking means interposed between the said rotor valve and the said thermostatic valve whereby when the said rotor valve is in the said pilot position, the said thermostatic valve is positively closed to prevent pilot gas which has passed through the rotor valve from going to the main burner while allowing said pilot gas to flow to a pilot burner, said rotor valve having a single port controlling the flow of gas for both the main burner and pilot burner.

4. A gas control comprising in combination, a manually operated valve of a rotary plug type, a safety valve in series with said plug valve, said safety valve being of a type automatically operable in response to failure of a pilot flame for cutting off a flow of gas, a thermostatic valve in series with said rotary valve for controlling a flow of gas to a main burner, and means providing communication between the outlet side of said rotary valve and the thermostatic valve and between the outlet side of the rotary valve and a pilot burner, the improvements comprising interlocking means interposed between said plug valve and said thermostatic valve whereby when said plug valve is operated manually to its pilot position the said thermostatic valve is positively closed to prevent pilot gas which passes through the plug valve from flowing to a main burner while allowing said pilot gas to flow to a pilot burner.

References Cited in the file of this patent

UNITED STATES PATENTS

| | | |
|---|---|---|
| 3,020,762 | Miller | Feb. 13, 1962 |
| 3,063,639 | Grayson et al. | Nov. 13, 1962 |

Dedication 3,122,317.—*Charles D. Coffey*, Inglewood, Calif. AUTOMATIC THERMOSTATIC CONTROL DEVICE. Patent dated Feb. 25, 1964. Dedication filed Oct. 13, 1969, by the assignee, *Controls Company of America*.

Hereby dedicates to the Public the entire terminal part of the term of said patent.

[*Official Gazette January 20, 1970.*]